(12) United States Patent
Hayashi et al.

(10) Patent No.: US 7,305,010 B2
(45) Date of Patent: Dec. 4, 2007

(54) MULTICAST COMMUNICATION SYSTEM

(75) Inventors: Tsunemasa Hayashi, Kanagawa (JP); Atsushi Takahara, Kanagawa (JP); Takako Sato, Chiba (JP); Daisuke Ando, Chiba (JP)

(73) Assignee: Nippon Telegraph and Telephone Corporation (JP)

( * ) Notice: Subject to any disclaimer, the term of this patent is extended or adjusted under 35 U.S.C. 154(b) by 1066 days.

(21) Appl. No.: 10/341,292

(22) Filed: Jan. 13, 2003

(65) Prior Publication Data

US 2003/0147392 A1 Aug. 7, 2003

(30) Foreign Application Priority Data

Jan. 11, 2002 (JP) ............................ P2002-004844

(51) Int. Cl.
H04J 3/24 (2006.01)

(52) U.S. Cl. ................... 370/473; 370/432; 713/170

(58) Field of Classification Search .............. None
See application file for complete search history.

(56) References Cited

U.S. PATENT DOCUMENTS

| | | | |
|---|---|---|---|
| 6,611,872 B1 * | 8/2003 | McCanne | 709/238 |
| 2002/0078184 A1 * | 6/2002 | Ujyo et al. | 709/220 |
| 2002/0091926 A1 * | 7/2002 | Fukutomi | 713/170 |

OTHER PUBLICATIONS

Tsunemasa Hayashi and Dave Allan, "An Introduction to IGAP.", DSL Forum, San Francisco Dec. 9-12, 2002.

S. Deering, W. Fenner, and B. Haberman, "Multicast Listener Discovery (MLD) for Ipv6", Network Working Group, Request for Comments: 2710, Oct. 1999.
W. Fenner, "Internet Group Management Protocol, Version 2", Network Working Group, Request for Comments: 2236, Nov. 1997.
B. Cain, S. Deering, I. Kouvelas, B. Fenner, and A. Thyagarajan, "Internet Group Management Protocol, Version 3", Network Working Group, Request for Comments: 3376, Oct. 2002.
Daisuke Andou, Takako Sato, Tsunemasa Hayashi, Akihiro Tanabe, Kaori Izutsu, Yoshinori Goto, Yukikuni Nishida, and Wataru Inoue, "IGMP for user Authentication Protocol (IGAP) <draft-andou-igmp-auth-00.txt>", Internet Engineering Task Force, Internet-Draft, Apr. 2002.
Daisuke Andou, Takako Sato, Tsunemasa Hayashi, Akihiro Tanabe, Kaori Izutsu, Yoshinori Goto, Yukikuni Nishida, and Wataru Inoue, "IGMP for user Authentication Protocol (IGAP) <draft-andou-igmp-auth-01.txt>", Internet Engineering Task Force, Internet-Draft, Jun. 2002.
Tsunemasa Hayashi, Daisuke Andou, Haixiang He, Wassim Tawbi, and Teruki Niki, "IGMP for user Authentication Protocol (IGAP) <draft-hayashi-igap-00.txt>", Internet Engineering Task Force, Internet Draft, Oct. 2002.

(Continued)

*Primary Examiner*—Duc Ho
(74) *Attorney, Agent, or Firm*—Kilpatrick Stockton LLP

(57) ABSTRACT

In order to make the client host capable of learning an accounting information or an authentication failure information, the accounting information or the authentication failure reason is notified from the routing device 2 to the client host 3, by adding an information regarding the accounting or an information regarding a reason for the authentication failure of the client host 3, to a packet of a protocol based on IGMP or MLD which is a multicast control packet between the client host 3 and the router device 2.

9 Claims, 12 Drawing Sheets

OTHER PUBLICATIONS

Norihiro Ishikawa, Nagatsugu Yamanouchi, and Osamu Takahashi, "IGMP Extension for Authentication of IP Multicast Senders and Receivers", Internet-Draft, Aug. 5, 1998.

Haixiang He, Brad Cain, and Thomas Hardjono, "Upload Authentication Information Using IGMPv3 <draft-he-magma-igmpv3-auth-00.txt>", Internet Engineering Task Force, Internet-Draft, Nov. 2001.

Brian Coan, Vikram Kaul, Sanjai Narain, and William Stephens, "HASM: Hierarchical Application-Level Secure Multicast <draft-coan-hasm-00.txt>", Internet-Draft, Nov. 2001.

Y. Yamanouchi, N. Ishikawa, and O. Takahashi, "RADIUS Extension for Multicast Router Authentication", <draft-yamanouchi-radius-ext-00.txt>, Mar. 12, 1998.

* cited by examiner

FIG. 13
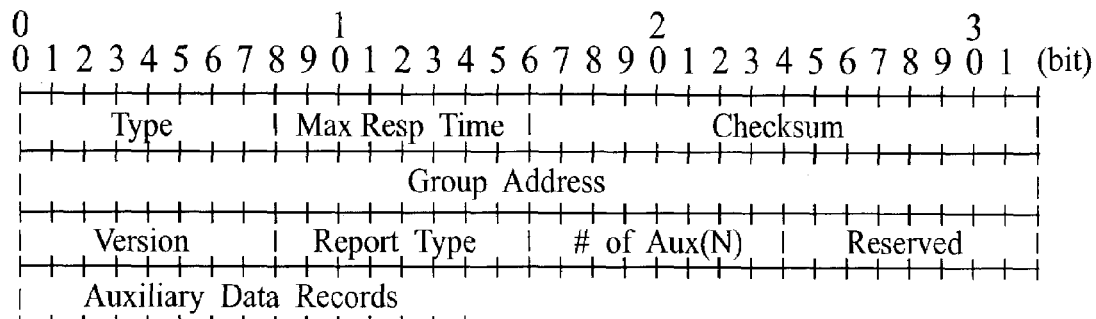
where each Auxiliary Data Record has the following format:
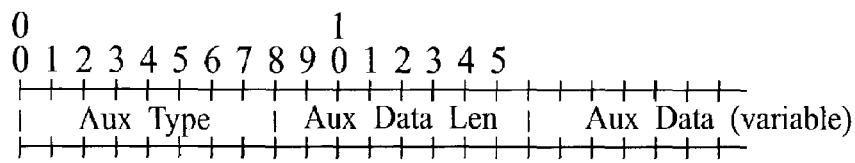
FIG. 14
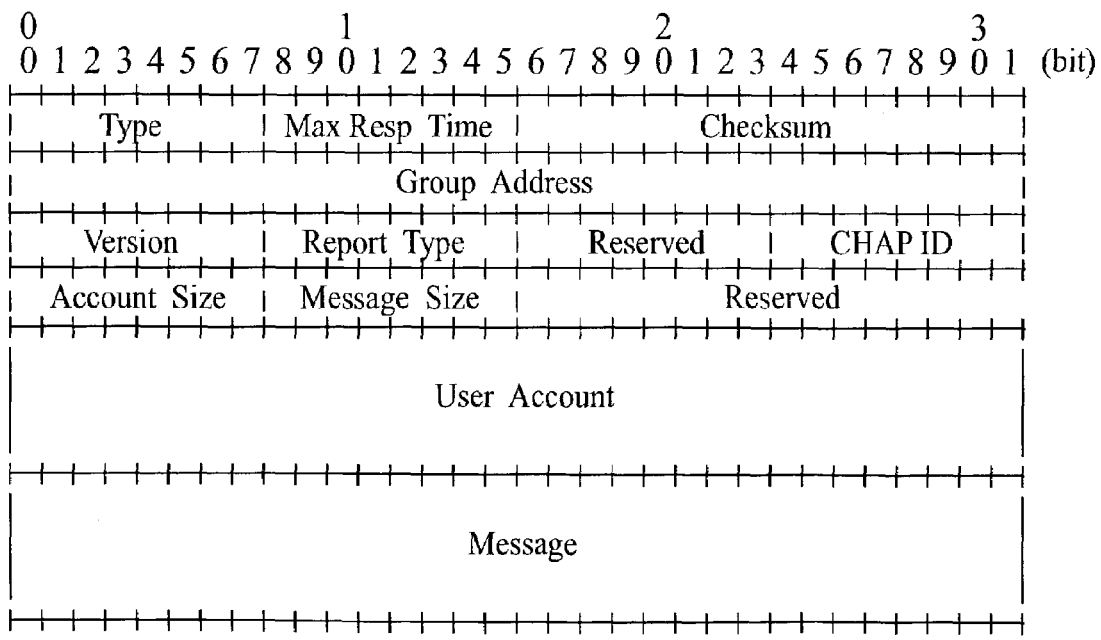

MULTICAST COMMUNICATION SYSTEM

BACKGROUND OF THE INVENTION

1. Field of the Invention

The present invention relates to a communication technique that utilizes multicasting in a network communication formed by a plurality of network hosts and routers such as computers, and switches, etc.

2. Description of the Related Art

The multicasting is a technique for transmitting identical information from one host to a plurality of hosts or from a plurality of hosts to a plurality of hosts, within some group. In order to realize the multicast on the Internet, a packet to which a special IP address is assigned is used, and a multicast router or switch (hereafter referred to as "routing device") that received such a packet delivers that packet to hosts participating to that group (which will be referred to as "client hosts"). For interface between the client hosts and the routing device, a multicast control IGMP (Internet Group Management Protocol) packet separate from that for data transfer is used, and when the client host joins or leaves the multicast group, for example, the IGMP message indicating this fact is transmitted to the routing device.

However, in the conventional multicast protocol, the control information that the client hosts can receive from the routing device is very limited. For example, in the information delivery service for delivering video data, music data, etc., the accounting for the multicast data is carried out, but conventionally there is no means for notifying information regarding the accounting to the client host, and it has been difficult to know not only the accounted fee but even whether the accounting is to be carried out or not, at the client host. Also, in the case of joining to the multicast group which requires the authentication, even when the authentication fails for some reason, it has been impossible to notify that reason to the client host.

BRIEF SUMMARY OF THE INVENTION

The present invention has an object of providing a multicast communication system which is capable of resolving such problems, and learning an accounting information or an authentication failure information at the client host.

According to the first aspect of the present invention, there is provided, in a multicast communication system having a routing device connected to a network and one or more client hosts connected to the network through this routing device, and in which each one of the one or more client hosts includes request means for transmitting a multicast control packet for requesting joining or leaving a multicast group, to the routing device, and the routing device includes delivery means for receiving multicast data to which a specific address is assigned for each multicast group, and delivering it to client hosts participating in that multicast group, the multicast communication system characterized in that the routing device includes means for notifying a client host by using a network layer protocol, by adding an information indicating an accounting start to a multicast control packet, when multicast data to be delivered is accounting target and the client host starts to receive the multicast data that are accounting target, and each one of the one or more client hosts includes means for recognizing an accounting start from the multicast control packet by using the network layer protocol.

The "accounting processing" is not limited to carrying out all of the accounting processing by itself, and includes a processing for requesting the accounting processing to another means provided in the network and a processing to receive information on that accounting processing.

According to the second aspect of the present invention, there is provided, in a multicast communication system having a routing device connected to a network and one or more client hosts connected to the network through this routing device, and in which each one of the one or more client hosts includes means for transmitting a multicast control packet to which an information for identifying a multicast group and a client information for identifying itself are added, in order to request joining to the multicast group which requires authentication, to the routing device, and the routing device includes delivery means for receiving multicast data to which a specific address is assigned for each multicast group, and delivering it to client hosts participating in that multicast group, the multicast communication system characterized in that the routing device includes means for notifying a corresponding client host by using a network layer protocol, when the authentication fails as a result of carrying out the authentication of a client host in response to the multicast control packet for requesting joining to the multicast group that requires the authentication from each client host, by adding an information indicating its reason to a multicast control packet, and each one of the one or more client hosts includes means for recognizing a reason for an authentication failure from the multicast control packet by using the network layer protocol.

The "authentication processing" is not limited to carrying out all of the authentication processing by itself, and includes a processing for requesting the authentication processing to another means provided in the network and a processing to receive that authentication result.

According to the third aspect of the present invention, there is provided, in a multicast communication system having a routing device connected to a network and one or more client hosts connected to the network through this routing device, and in which each one of the one or more client hosts includes request means for transmitting a multicast control packet for requesting joining or leaving a multicast group, to the routing device, and the routing device includes delivery means for receiving multicast data to which a specific address is assigned for each multicast group, and delivering it to client hosts participating in that multicast group, the multicast communication system characterized in that each one of the one or more client hosts includes means for transmitting a multicast control packet by adding an information for requesting an information on a fee charged for received multicast data, to the routing device by using a network layer protocol, the routing device includes means for returning a multicast control packet to which an accounting information by an accounting processing to be carried out when multicast data to be delivered is an accounting target is added, by using the network layer protocol, in response to the multicast control packet for requesting a fee information from a client host, and each one of the one or more client hosts further includes means for recognizing an accounting information from a returned multicast control packet by using the network layer protocol.

The routing device and the client host device according to each aspect mentioned above can be practiced independently by itself. The present invention encompasses such a routing device or a client host device. Also, the present invention encompasses a computer program for realizing the operation of the routing device or the client host device indicated by the aspects mentioned above, and a recording medium that records such a computer program.

BRIEF DESCRIPTION OF THE DRAWINGS

FIG. 13 is a figure showing one exemplary IGAP message format that can be used in the present invention.

FIG. 14 is a figure showing another exemplary IGAP message format that can be used in the present invention.

DETAILED DESCRIPTION OF THE INVENTION

First, the major features of the present invention will be described. Conventionally there has been no technique for carrying out a user accounting processing in synchronization with an access (content receiving request, finishing) to the multicast content. Here, the access to the multicast content means joining/leaving a multicast group in terms of the network processing. Conventionally, there have been cases where the communications are carried out separately from the access to the multicast, and the accounting processing is carried out regardless of whether the user is really receiving the content. For this reason, in the present invention, the accounting processing is carried out in synchronization with the access to the content by the user, such that the accounting becomes possible simultaneously with the content receiving by the user, and the safer content delivery service becomes possible.

In the present invention, at a time of the access to the multicast content, the reason for the user authentication failure result is transmitted on a network layer (the same layer as IP, IGMP, etc.), and this is what has been done on an application layer conventionally. However, the application layer is an upper layer than the IP layer, and requires a more complicated processing sequence, so that not only the information transmission processing itself requires time but also the processing load in a device is large and the execution speed is lowered. In contrast, in the present invention, the information on the reason for the failure of the authentication is conveyed by a packet of the network layer such as IGMP, so that it is possible to realize the high speed transmission and the simplified processing at a device.

Next, the embodiments of the present invention will be described in detail with references to the drawings. Note that, in the following embodiments, the case of using IGMP (Internal Group Management Protocol) as an example of the network layer protocol will be described, but the present invention can be realized similarly by using a protocol based on IGMP or MLD other than IGMP, such as IGMPv2, IGMPv3, MLD (Multicast Listener Discovery), and IGAP (IGMP for user Authentication Protocol).

Figure 1:
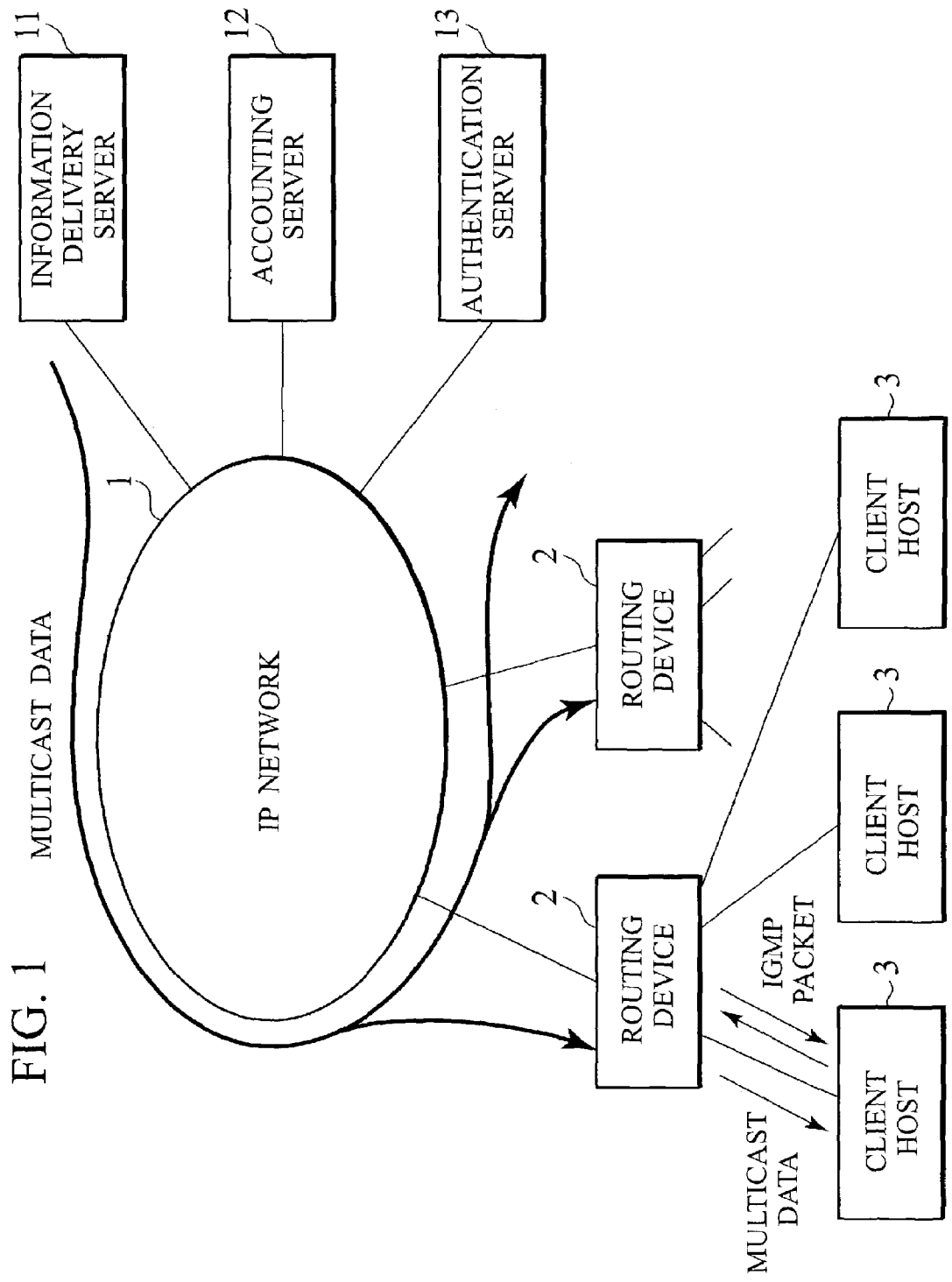
FIG. 1 is a block diagram showing an exemplary basic configuration of a multicast communication system for practicing the present invention.

FIG. 1 shows an exemplary basic configuration of a multicast communication system for practicing the present invention, which is common to each embodiment to be described below. Here, an example of a multicast group for carrying out the information delivery service such as that of video data will be described.

This multicast communication system has a routing device 2 connected to an IP network 1 and one or more client hosts 3 connected to the IP network 1 through this routing device 2. Also, in the IP network 1, an information delivery server 11 for delivering information, an accounting server 12 for carrying out an accounting processing in response to a request from the routing device 2, and an authentication server 13 such as RADIUS for carrying out an authentication of the client host 3 in response to a request from the routing device 2 are provided.

The information delivery server 11 transmits information in the IP network 1 by using a packet to which a multicast IP address is assigned. In the multicast IP address, a region for indicating that this packet is the multicast data and a region for identifying the multicast group are provided. Upon receiving the packet with such an IP address, the routing device 2 delivers that packet to the client hosts 3 that are participating in that multicast group.

In order for the client host 3 to join or leave the multicast group, this fact is notified to the routing device 2 by using the IGMP packet. The routing device 2 identifies the individual client host 3 according to a physical port number, a user ID, a password, an ID address of the client host, or their combination, for example, and manages which multicast group that client host 3 is participating.

Also, when the joining to the multicast group that requires the authentication is requested from the client host 3, the routing device 2 sends information for authenticating that client host 3 to the authentication server 13, and receives the authentication result from the authentication server 13. When the multicast group is fee charging (whether it is fee charging or not may be judged before the authentication request from the routing device 2 to the authentication server 13), after the authentication of the client host 3 by the authentication server 13, the accounting processing is requested to the accounting server 12 (the accounting processing may be requested from the authentication server 13 to the accounting server 12, but in that case the authentication request and the authentication finishing request will be sent from the routing device 2 to the authentication server 13), and the accounting server 12 carries out the accounting processing according to the amount of received data (or the number of times for receiving per day, per week, per month, etc.), for each client host 3 or for each received service that is the accounting target.

Here the example in which the accounting processing is carried out by the accounting server 12 in response to the request of the routing device 2 is described, but it is also possible to provide an accounting database in each routing device 2 and carry out the accounting processing at each one. Also, the basic is to carry out the authentication of the client host before the accounting processing, but depending on the utilization style, there can be cases where the authentication is unnecessary.

FIRST EMBODIMENT

Figure 2:
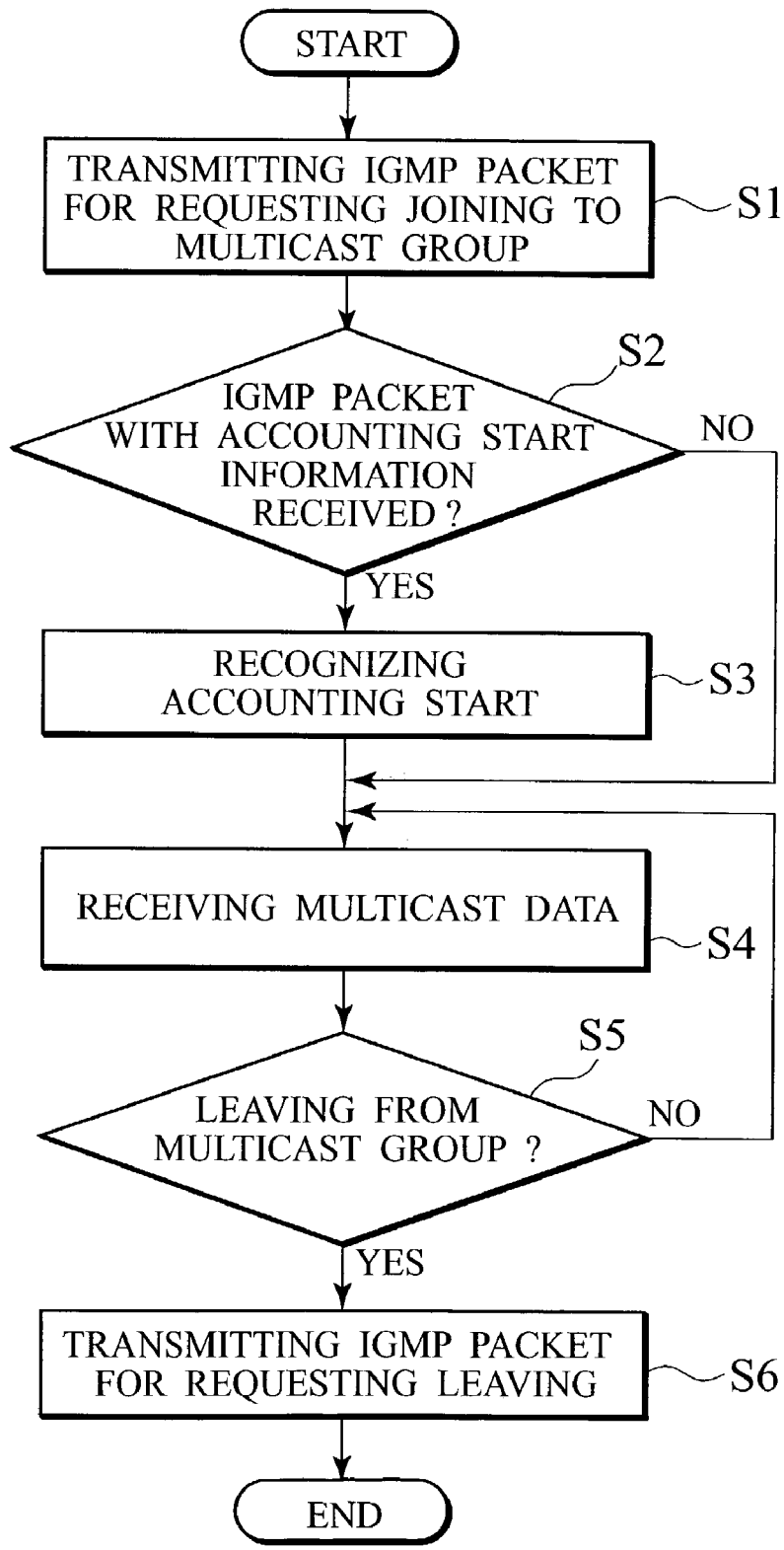
FIG. 2 is a flow chart for joining and leaving a multicast group by a client host, which is a figure for explaining the first embodiment of the present invention.
Figure 3:
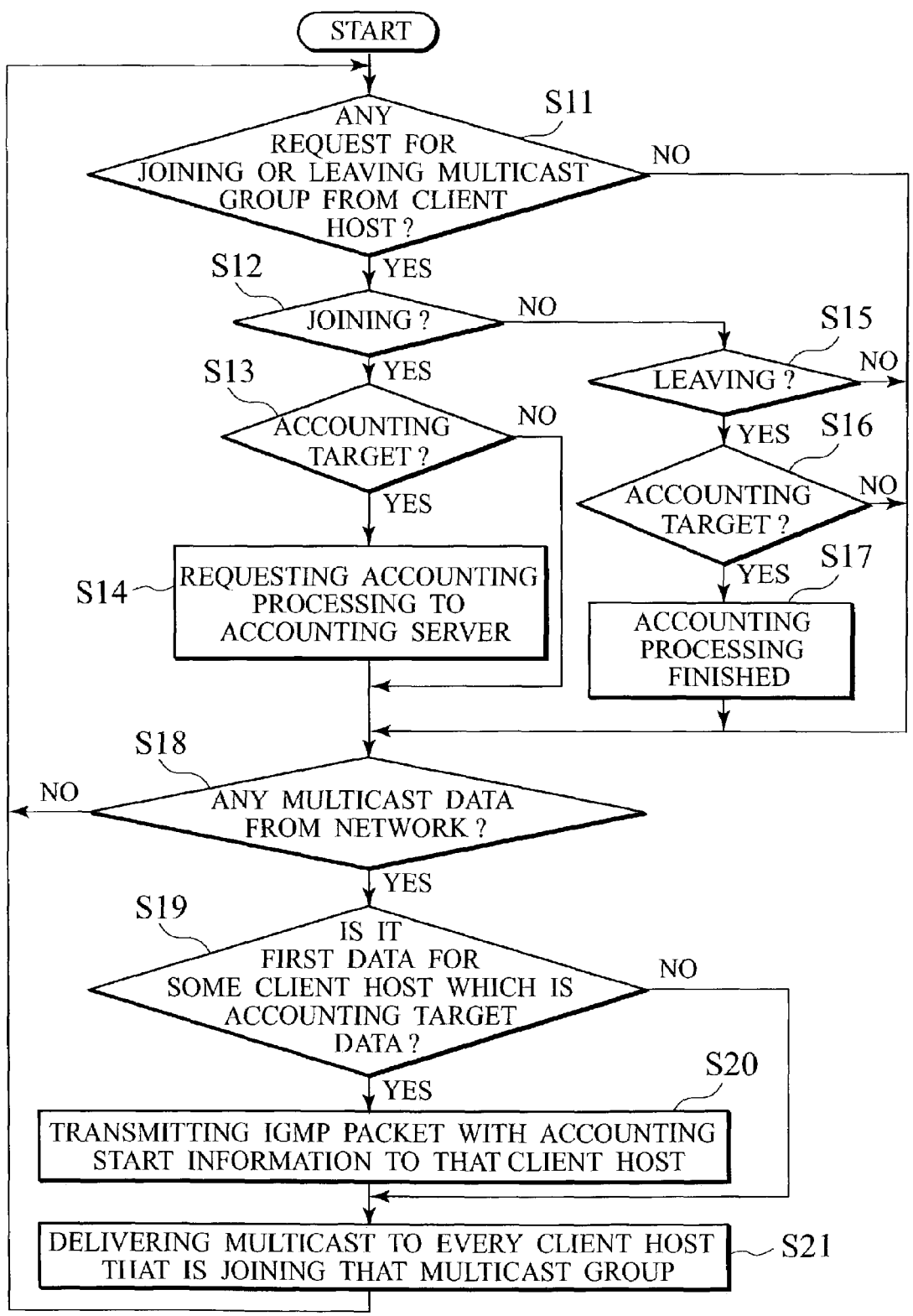
FIG. 3 is a flow chart for a processing of a routing device with respect to a client host.
Figure 4:
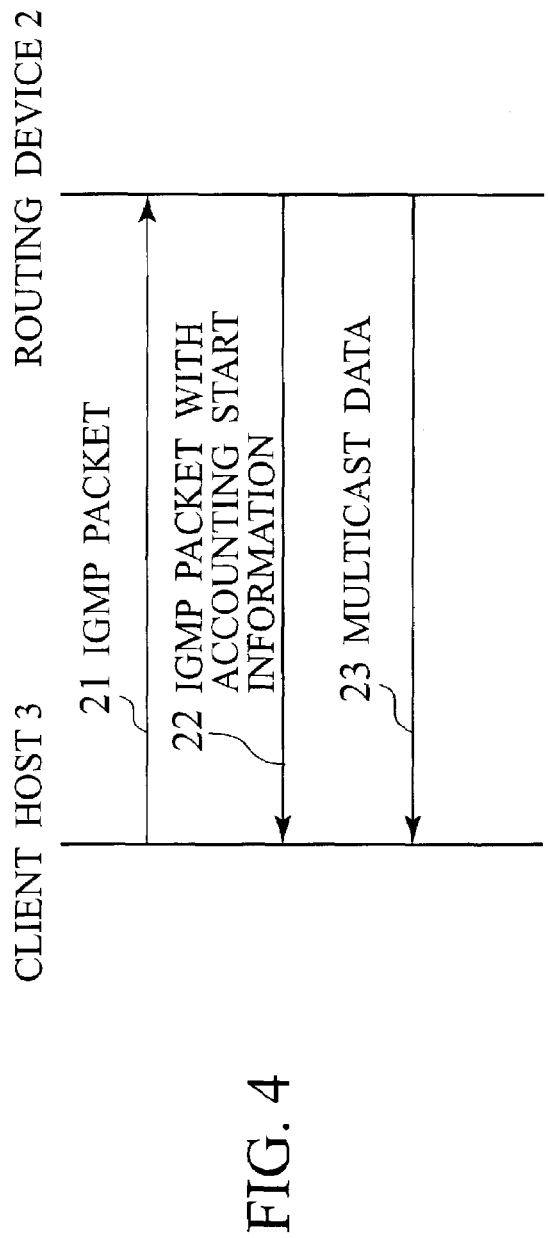
FIG. 4 is a timing sequence for notifying an accounting information to a client host.
Figure 5:
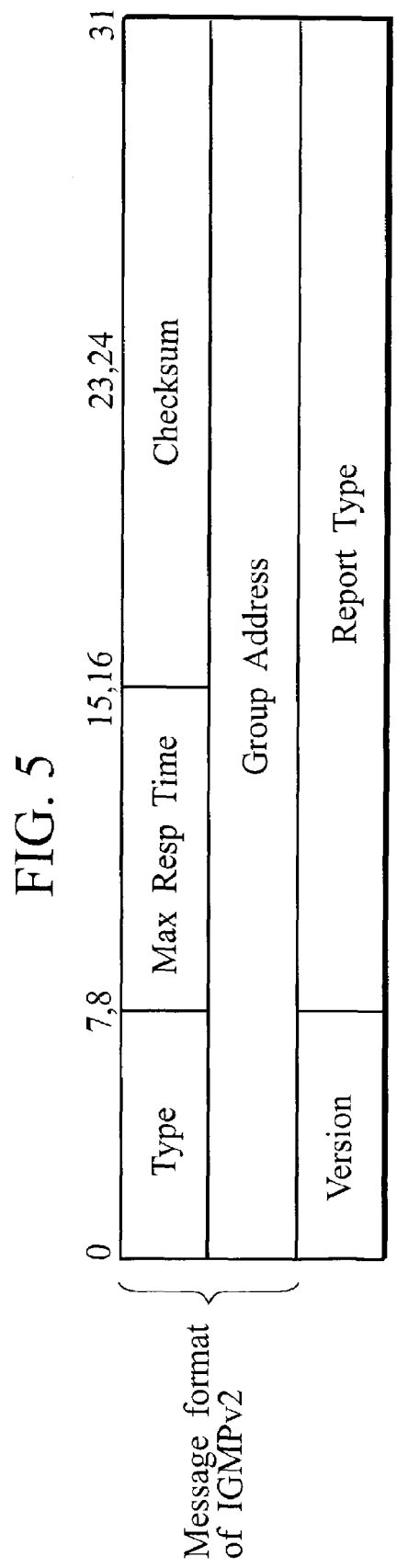
FIG. 5 is an IGMP message format that can store an accounting start information.

FIG. 2 to FIG. 5 are figures for explaining the first embodiment of the present invention, where FIG. 2 is a flow chart for joining and leaving the multicast group by the client host, FIG. 3 is a flow chart for the processing of the routing device with respect to the client host, FIG. 4 is a timing sequence for notifying the accounting information to the client host, and FIG. 5 shows an IGMP packet format that can store the accounting start information.

The client host 3 requests the joining to the multicast group or the leaving from the multicast group to the routing device 2 by using the IGMP packet. The routing device 2 processes the IGMP packet from the client host 3 and, when the multicast data from the IP network 1 are received, delivers them to all the client hosts 3 that are participating in that multicast group. The description of the protocol between the routing device 2 and the IP network 1 is omitted.

When the request from the client host 3 is the joining to the fee charging multicast group which is the accounting target, the routing device 2 starts the accounting processing, and transmits the requested multicast data to the client host 3. At this point the routing device 2 transmits the IGMP packet in which information for notifying the accounting start is added to the IGMP message, simultaneously as, or before or after, transmitting the first multicast data toward the client host 3. The client host 3 recognizes that the accounting will be started or the accounting has been started, by receiving the IGMP in which the information for notifying the accounting start is added. In order to notify this information on the accounting start to the user, the received accounting start information is displayed on a monitor screen or the like of the client host 3, for example. Note that, in the case of the step S18 NO in FIG. 3, it is also possible to request the delivery of the data toward the information delivery server 11.

In order to transmit or receive the information indicating the accounting start by the IGMP packet, there is a need to expand the known IGMP message format as shown in FIG. 5, for example. In this expanded IGMP message format, in addition to the 8 bytes message format used in the conventional IGMPv2 protocol, one byte "Version" and 3 bytes "Report Type" are added. As for the "Version", what was conventionally provided at a top in 4 bits is expanded to 8 bits and moved. The information on the accounting start is indicated by 0x 66, for example, and stored in the "Report Type".

SECOND EMBODIMENT

Figure 6:
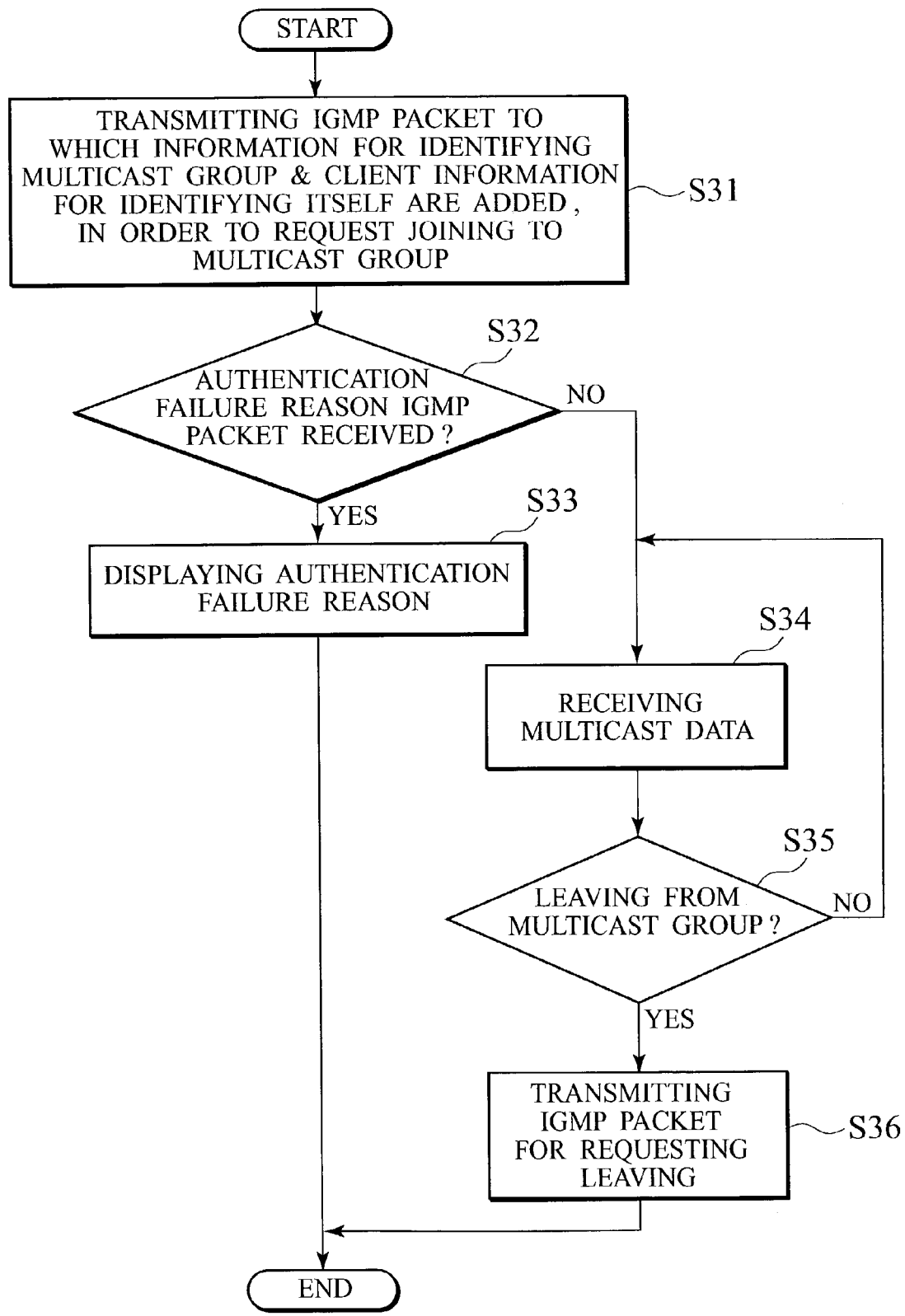
FIG. 6 is a flow chart for joining and leaving a multicast group by a client host, which is a figure for explaining the second embodiment of the present invention.
Figure 7:
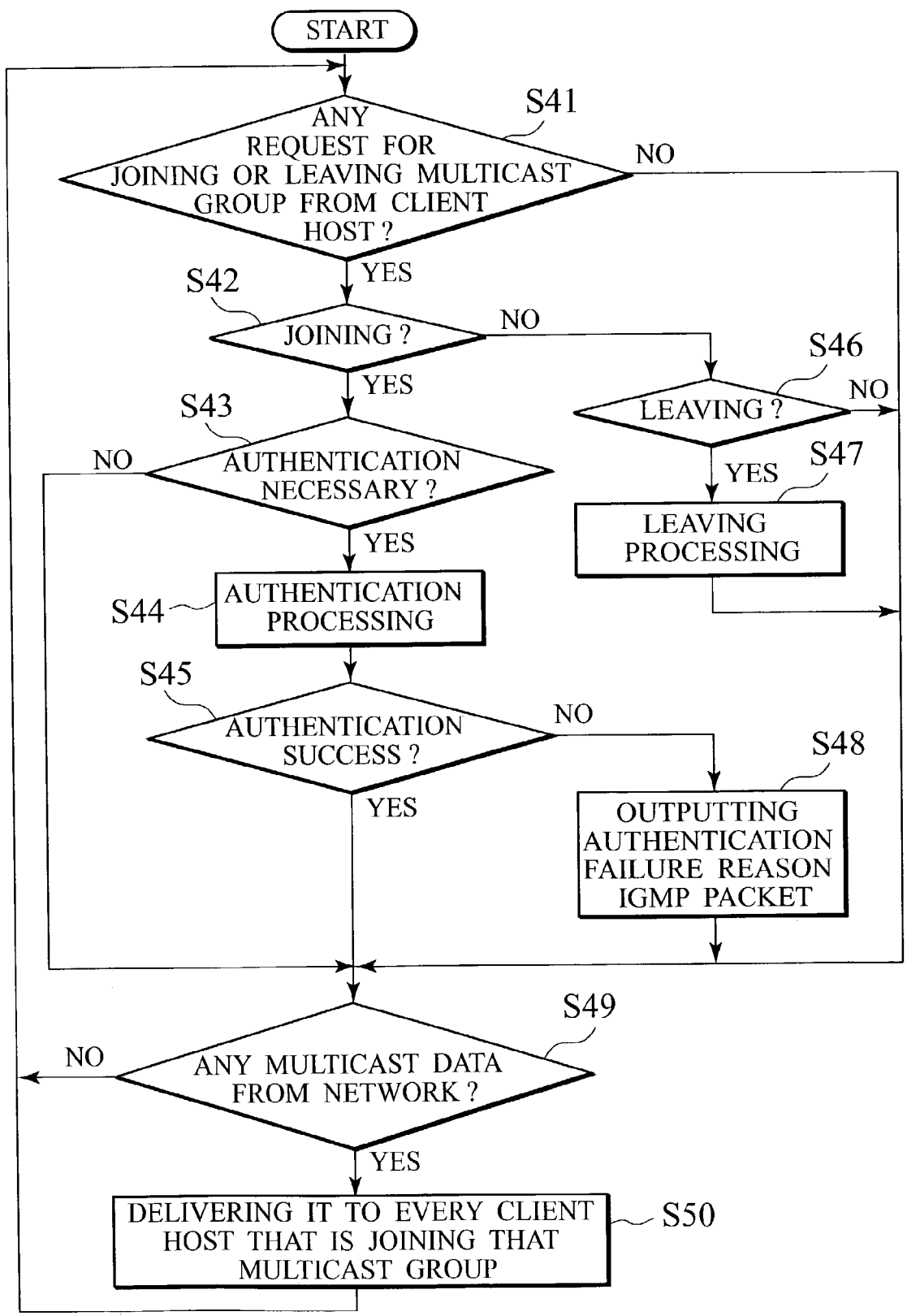
FIG. 7 is a flow chart for a processing of a routing device with respect to a client host.
Figure 8:
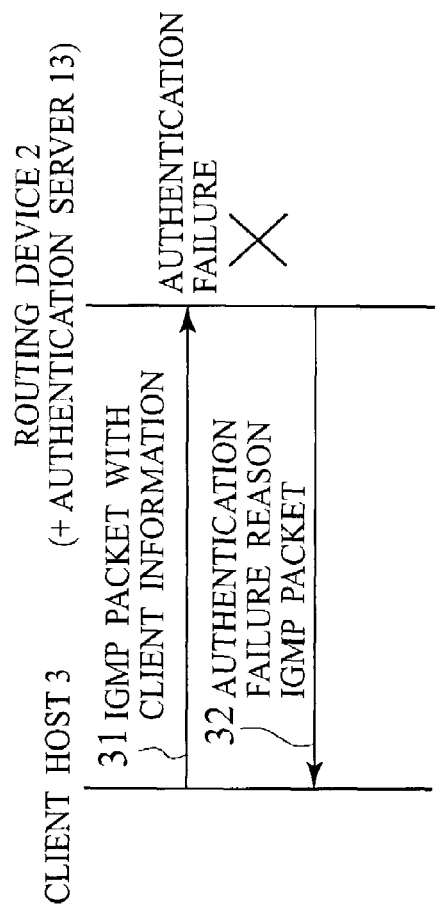
FIG. 8 is a timing sequence for notifying an authentication failure information to a client host.
Figure 9:
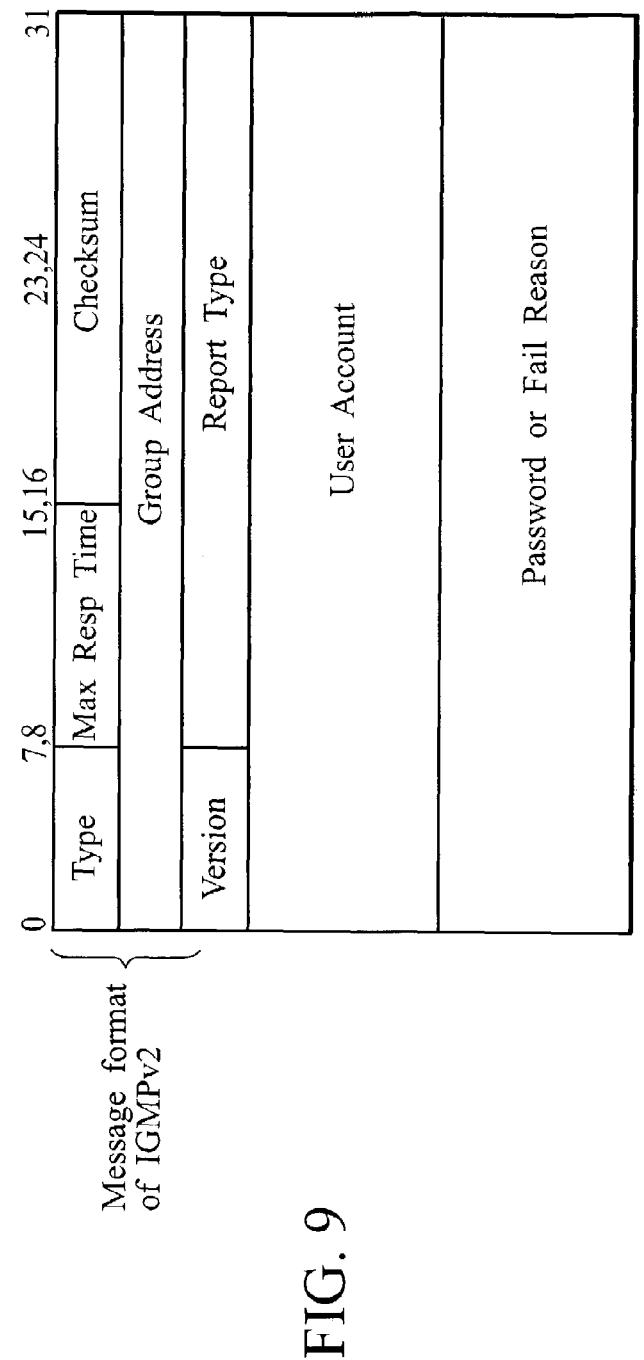
FIG. 9 is an IGMP message format that can store information for carrying out an authentication.

FIG. 6 to FIG. 9 are figures for explaining the second embodiment of the present invention, where FIG. 6 is a flow chart for joining and leaving the multicast group by the client host, FIG. 7 is a flow chart for the processing of the routing device with respect to the client host, FIG. 8 is a timing sequence for notifying the authentication failure information to the client host, and FIG. 9 shows an IGMP packet format that can store the information for carrying out the authentication.

In order to request the joining to the multicast group that requires the authentication, the client host 3 transmits the IGMP packet in which an information for identifying that multicast group and a client information for identifying itself are added, to the routing device 2. The client information includes a user account and a user password. The routing device 2 processes the IGMP packet from the client host 3, and requests the user authentication of the client host 3 to the authentication server 13 such as RADIUS. After the client host 3 is authenticated, the data of that multicast group are delivered to the client host 3 whenever they are received from the IP network 1.

In the case where the authentication of the client host 3 failed, the routing device 2 transmits the IGMP packet to which an information on the reason for that failure is added, to the client host 3. The client host 3 can learn the reason for the authentication failure, by receiving this IGMP packet. In order to notify the reason for the authentication failure to the user, the reason notified as a code by the IGMP packet is converted into a sentence and displayed on a monitor screen or the like of the client host 3, for example. Note that, in the case of the step S49 NO in FIG. 7, it is also possible to request the delivery of the data toward the information delivery server 11.

In order to transmit or receive the client information or the information on the authentication failure reason by the IGMP packet, regions for "User Account" and "Password or Reason" are added to the IGMP message format, as shown in FIG. 9. The client information is stored in the regions of "User Account" and "Password or Fail Reason", and the reason for the authentication failure is stored in the "Report Type", and the "Password or Fail Reason" if more information is necessary. For example, when an attempt to join the multicast group to which the participation is not allowed is made, the reason 0x77 is stored in the "Report Type".

THIRD EMBODIMENT

Figure 10:
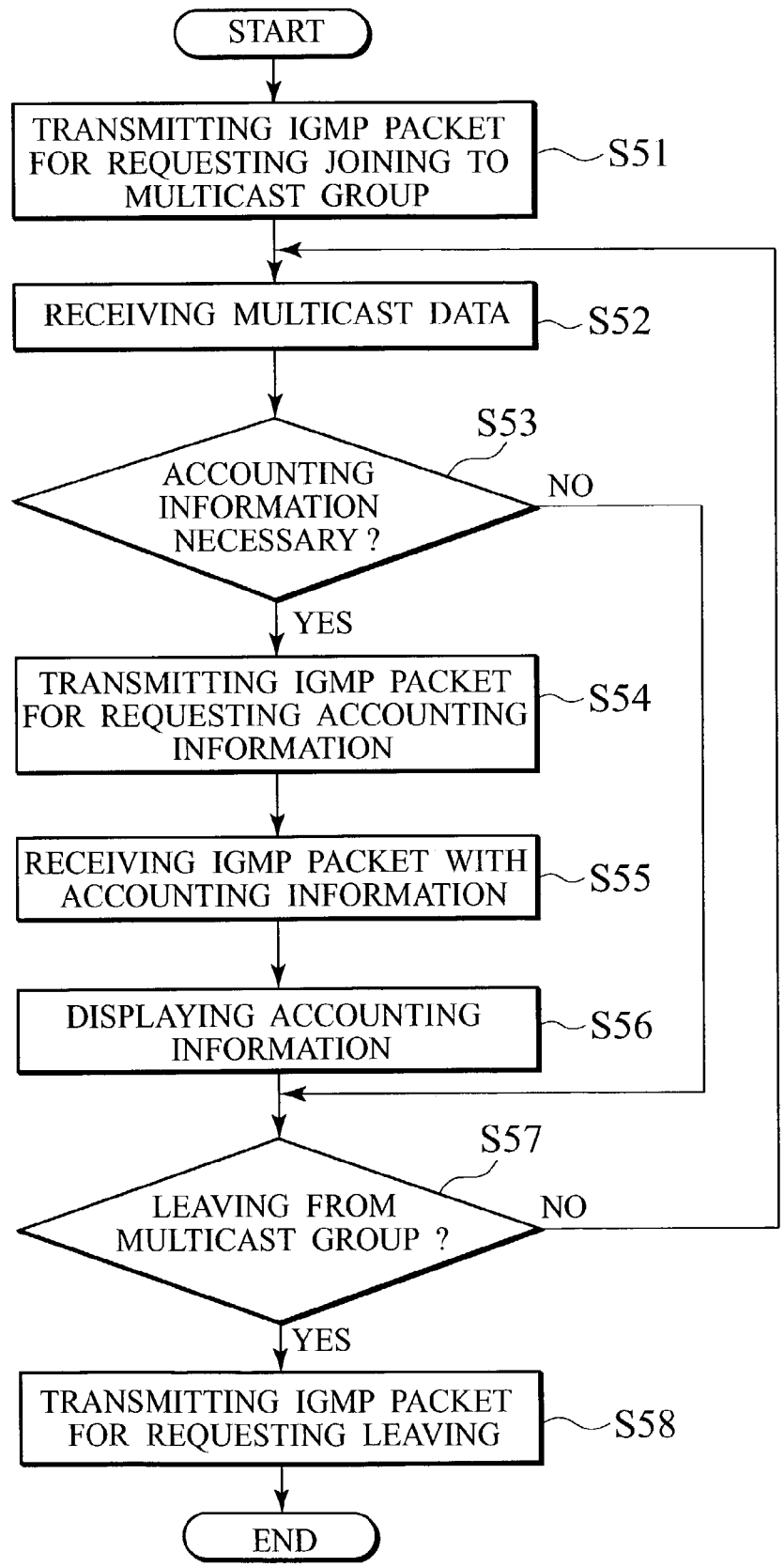
FIG. 10 is a flow chart for joining and leaving a multicast group by a client host, which is a figure for explaining the third embodiment of the present invention.
Figure 11:
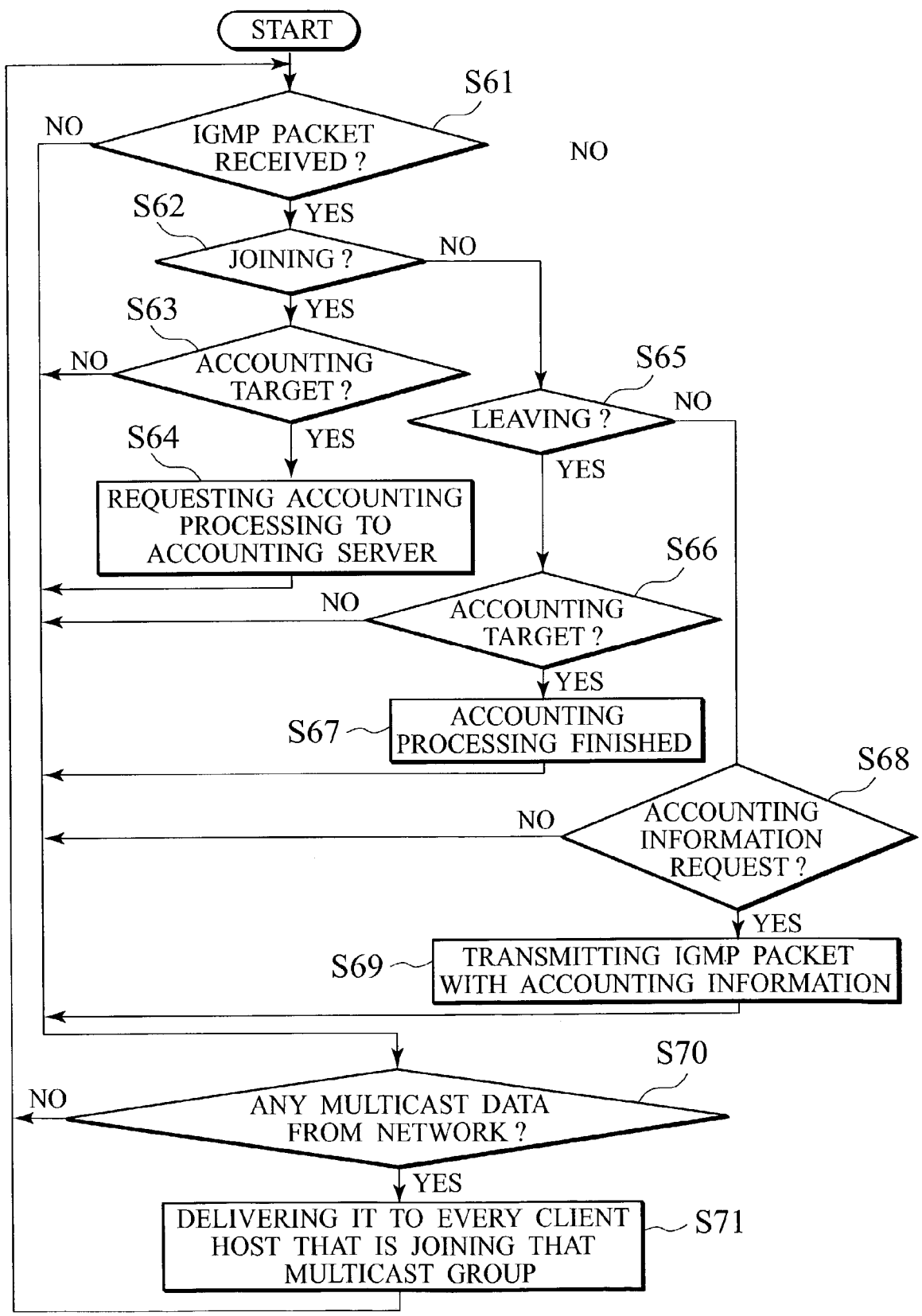
FIG. 11 is a flow chart for a processing of a routing device with respect to a client host.
Figure 12:
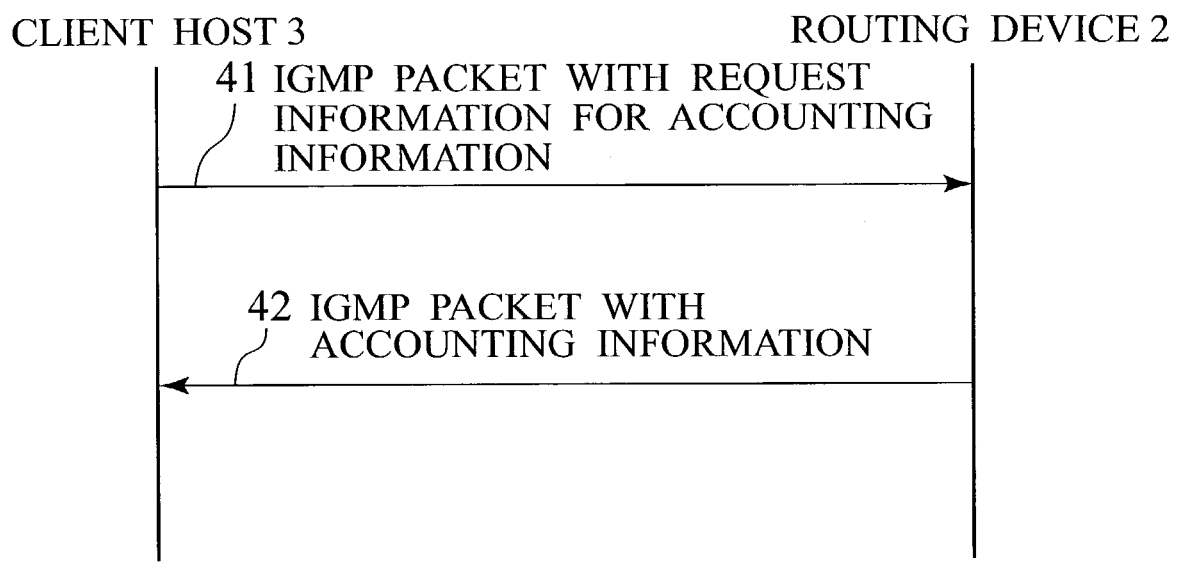
FIG. 12 is a timing sequence for notifying an accounting information to a client host.

FIG. 10 to FIG. 12 are figures for explaining the third embodiment of the present invention, where FIG. 10 is a flow chart for joining and leaving the multicast group by the client host, FIG. 11 is a flow chart for the processing of the routing device with respect to the client host, and FIG. 13 is a timing sequence for notifying the accounting information to the client host.

The client host 3 joins the multicast group by using the IGMP packet, and acquires the multicast data. In the case of receiving the fee charged multicast data which is the accounting target, the IGMP packet in which an information indicating the accounting information request is added to the IGMP message can be transmitted to the routing device 2 at a time of start receiving, while receiving, or after receiving is finished.

When such an IGMP packet is received, the routing device 2 pulls out the accounting information of that client host 3 from the accounting information database managed by itself or the accounting database server 12 in the IP network 1, and transmits the IGMP packet to which that information is added, to the client host 3. In this way, the client host 3 can acquire the accounting information. Note that, in the case of the step S70 NO in FIG. 11, it is also possible to request the delivery of the data toward the information delivery server 11.

Note that, as the message format of each IGMP packet in the first, second and third embodiments described above, it is possible to use the IGAP message format shown in FIG. 13 and FIG. 14, instead of the IGMPv2 message format shown in FIG. 5 and FIG. 9.

Also, in the case of the IGMPv2 message format, the information regarding the authentication processing or the information regarding the accounting processing can be transmitted by storing it in fields other than the "Report Type" such as "Type", "Version", and "User Account" in the packet format described above.

Also, in the case of the IGAP message format, the information regarding the authentication processing or the information regarding the accounting processing can be transmitted by storing it in fields such as "Type", "Version", "Report Type", "User Account", "Message", "Aux Type", and "Aux Data", but normally it is preferable to store it in the "User Account" field, or the "Message" field, or the "Aux Data" field.

Also, in the case of the IGAP message format, it is possible to use Accounting Action Result Messages: 0x11 (Accounting Start), 0x12 (Accounting Stop) as the information on the accounting start, Vendor Specific Authentication Messages: 0x31 (Unknown User Account), 0x32 (Unknown Group Address), 0x33 (Request to participate in a multicast group rejected), 0x41 (Invalid Group Address) as the information on the authentication failure reason, and Vendor Specific Accounting Messages: 0x31 (Notification of charge-free), 0x32 (Notification of excess time) as the accounting information.

Next, the internal configuration of the client host (terminal) 3 and the routing device (router) 2 for realizing the present invention will be described in further detail with reference to FIG. 15.

Figure 15:
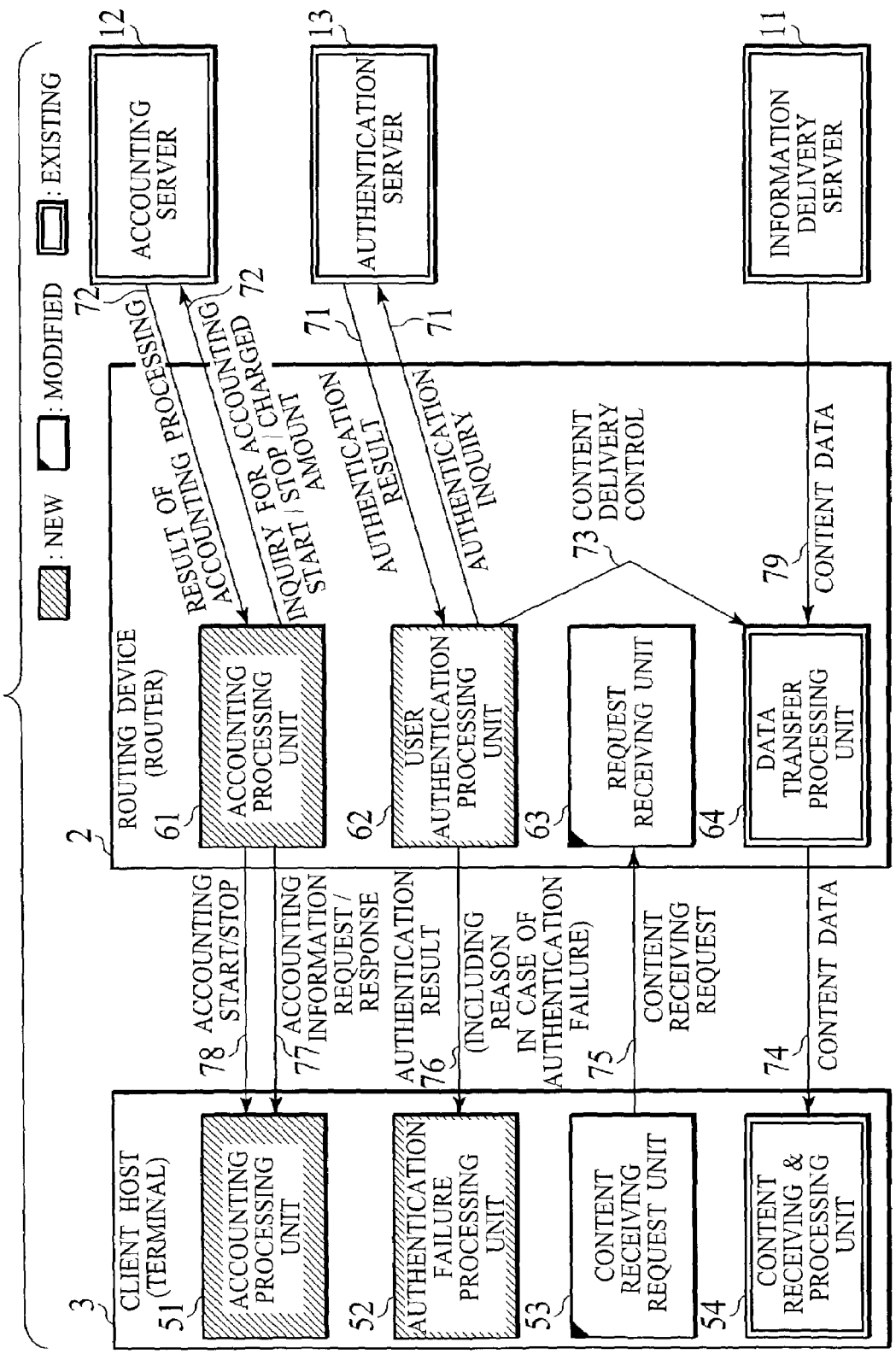
FIG. 15 is a block diagram showing an exemplary internal configuration of a client host (terminal) and a routing device (router) of the present invention.

As shown in FIG. 15, the terminal 3 has an accounting processing unit 51, an authentication failure processing unit 52, a content receiving request unit 53, and a content receiving and processing unit 54. Among them, the accounting processing unit 51 and the authentication failure processing unit 52 are functional blocks newly added by the present invention, and the content receiving request unit 53 is a functional block for which partial modification is required by the present invention, but the content receiving and processing unit 54 can be the existing one.

On the other hand, the router 2 has an accounting processing unit 61, a user authentication processing unit 62, a request receiving unit 63, and a data transfer processing unit 64. Among them, the accounting processing unit 61 is a functional block newly added by the present invention, and the user authentication processing unit 62 and the request receiving unit 63 are functional blocks for which partial modification is required by the present invention, but the data transfer processing unit 64 can be the existing one.

In the processing between the terminal 3 and the router 2, the the multicast access protocol such as IGMPv2, IGMPv3, MLD, or IGAP that is the network layer protocol will be used, except for the content data delivery 74. Note however that, in the case of using IGMPv2, IGMPv3 or MLD, there is a need to add the information necessary for the authentication and the information regarding the accounting to these protocols. IGAP is a protocol produced by adding these information to IGMPv2.

First, the terminal will be described. In the existing terminal (device), a proposal of a technique for carrying out the function for authenticating the client on the network layer of IGMP has existed, but the function for processing the reason in the case of the authentication failure did not exist. In the prior art, the information necessary for the user authentication is added to the Join packet (watching request packet) of IGMP and transmitted, and only the result of the authentication success or failure is returned.

In the terminal 3 of the present invention, by adding the "authentication failure processing unit 52" for processing the reason for the authentication failure, in the case where the user authentication failure reason is transmitted to the terminal 3 by the network layer protocol (IGAP, for example) from the network side, it is possible to process that. IGAP is a protocol for enabling the authentication and the accounting processing by expanding the existing multicast access protocol IGMP.

Also, by newly adding the "accounting processing unit 51" to the terminal 3, after the user authentication processing that is carried out at a time of accessing the multicast content, the information for notifying the accounting processing result (start or end) with respect to the receiving of the multicast content requested by the content receiving request packet Join by the user is transmitted by the network layer packet, so that it can be transmitted at high speed, and it is possible to simplify the processing in the device.

As a manner of implementing the terminal 3, it is also possible to incorporate the authentication failure processing unit 52 into the content receiving request unit 53 of the terminal 3, and in that case, the content receiving request unit 53 is to be modified. Also, as another manner of implementing the terminal 3, it is also possible to incorporate the accounting processing unit 51 into the content receiving request unit 53 of the terminal 3, and in that case also, the content receiving request unit 53 is to be modified.

Next, the router 2 will be described. In the existing router (device), a proposal of a technique for authenticating the user with respect to the access (content receiving start and end request) with respect to the multicast content from the terminal device of the user has existed, but a function for processing the reason in the case where the user authentication failed and transmitting that failure reason to the terminal device did not exist. After the authentication success, the user authentication processing unit 62 of the router 2 controls the data transfer processing unit 64 to deliver the multicast content delivered from the information delivery server (content server) 11, to the terminal 3, According to the router 2 of the present invention, when the receiving request packet (packet of the network layer such as IGMP) for the multicast from the user arrives at the request receiving unit 63, the request receiving unit 63 sends the user authentication information necessary for the user authentication to the user authentication processing unit 62 (in the Radius authentication, for example, the authentication processing is carried out by using the Radius protocol). The user authentication processing unit 62 makes an authentication inquiry to the authentication server (user authentication server) 13 existing in the external (remote), and receives the authentication result (sequence 71 in the figure). This authentication result is sent to the terminal device. At this point, in the case where the authentication failed, its reason is added simultaneously as information to the packet such as that of IGMP, such that it becomes possible for the terminal to judge the reason for the authentication failure at high speed, within a framework of the processing of the network layer such as IGMP.

This user authentication failure reason transmission processing becomes possible by newly adding the authentication failure reason processing function to the user authentication processing unit 62. As the authentication failure reason, it is possible to send information such as the password is wrong, or it is the access with respect to content not provided by the service, for example.

Also, in the router 2 of the present invention, by adding the accounting processing unit 61 to the router 2, after the user authentication at the user authentication processing unit 62, the user authentication processing unit 62 is made to notify the user authentication success to the accounting processing unit 61 such that the accounting processing unit 61 can make the external accounting server 12 to carry out the accounting processing (sequence 72 in the figure). By transmitting the accounting processing result (accounting start, end, amount) from the accounting processing unit 61 of the router 2 to the accounting processing unit 51 of the terminal 3 by using the packet of the network layer such as IGMP, it becomes possible to notify these information at high speed, by a simple processing.

Also, in the router 2 of the present invention, in the case where the accounting information acquisition is requested from the terminal 3 by utilizing the network layer packet (IGMP, for example), the router 2 can process this at the accounting processing unit 61. In response to such a request from this terminal 3, the accounting information (the detailed accounting information of this month, for example) is acquired by inquiring the accounting server 12 located at remote, and transmitted from the router 2 to the terminal 3 by using the packet of the network layer such as IGMP, such that it becomes possible to notify these information at high speed, by a simple processing.

Note that, the accounting server 12 located at remote may be stored in the router 2. Also, the authentication server 13 located at remote may be stored in the router 2.

Also, the authentication processing result and the accounting start information can be transmitted from the router 2 to the terminal 3 by storing them in the same network layer packet.

As described above, according to the present invention, in the case of receiving the fee charged multicast data, the accounting start information or the current accounting information can be learned at the client host. Also, in the case of carrying out the authentication of the client host, even when the authentication fails, the client host can learn its reason.

What is claimed is:

1. In a multicast communication system having a routing device connected to a network and one or more client hosts connected to the network through this routing device, and in which
each one of the one or more client hosts includes request means for transmitting a multicast control packet for requesting joining or leaving a multicast group, to the routing device, and
the routing device includes delivery means for receiving multicast data to which a specific address is assigned for each multicast group, and delivering it to client hosts participating in that multicast group,
the multicast communication system characterized in that
the routing device includes means for notifying a client host by using a network layer protocol, by adding an information indicating an accounting start to a multicast control packet, when multicast data to be delivered is accounting target and the client host starts to receive the multicast data that are accounting target, and
each one of the one or more client hosts includes means for recognizing an accounting start from the multicast control packet by using the network layer protocol.

2. The multicast communication system as described in claim 1, characterized in that the network layer protocol is a protocol based on IGMP (Internal Group Management Protocol) or MLD (Multicast Listener Discovery).

3. In a multicast communication system having a routing device connected to a network and one or more client hosts connected to the network through this routing device, and in which
each one of the one or more client hosts includes request means for transmitting a multicast control packet for requesting joining or leaving a multicast group, to the routing device, and
the routing device includes delivery means for receiving multicast data to which a specific address is assigned for each multicast group, and delivering it to client hosts participating in that multicast group,
the multicast communication system characterized in that
each one of the one or more client hosts includes means for transmitting a multicast control packet by adding an information for requesting an information on a fee charged for received multicast data, to the routing device by using a network layer protocol,
the routing device includes means for returning a multicast control packet to which an accounting information by an accounting processing to be carried out when multicast data to be delivered is an accounting target is added, by using the network layer protocol, in response to the multicast control packet for requesting a fee information from a client host, and
each one of the one or more client hosts further includes means for recognizing an accounting information from a returned multicast control packet by using the network layer protocol.

4. The multicast communication system as described in claim 3, characterized in that the network layer protocol is a protocol based on IGMP (Internal Group Management Protocol) or MLD (Multicast Listener Discovery).

5. A client host device in a multicast communication system having a routing device connected to a network and one or more client hosts connected to the network through this routing device, the client host device characterized by including
request means for transmitting a multicast control packet for requesting joining or leaving a multicast group, to the routing device,
means for receiving multicast data which is delivered by the routing device to client hosts participating in a multicast group, as the routing device receives the multicast data to which a specific address is assigned for each multicast group from the network, and
means for recognizing an accounting start by using a network layer protocol from a multicast control packet that is notified by the routing device to a client host by using the network layer protocol, by adding an information indicating an accounting start to the multicast control packet, when multicast data to be delivered is accounting target and the client host starts to receive the multicast data that are accounting target.

6. A routing device in a multicast communication system having a routing device connected to a network and one or more client hosts connected to the network through this routing device, and in which
means for receiving a multicast control packet for requesting joining or leaving a multicast group, transmitted by each one of the one or more client hosts,
delivery means for receiving multicast data to which a specific address is assigned for each multicast group, and delivering it to client hosts participating in that multicast group, and
means for notifying a client host by using a network layer protocol, by adding an information indicating an accounting start to a multicast control packet, when multicast data to be delivered is accounting target and the client host starts to receive the multicast data that are accounting target.

7. A computer-readable recording medium on which a computer program that when executed functions as a client host device as described in claim 6 is recorded.

8. A client host device in a multicast communication system having a routing device connected to a network and one or more client hosts connected to the network through this routing device, and in which request means for transmitting a multicast control packet for requesting joining or leaving a multicast group, to the routing device, and means for receiving multicast data which is delivered by the routing device to client hosts participating in a multicast group, as the routing device receives the multicast data to which a specific address is assigned for each multicast group from the network, and means for transmitting a multicast control packet by adding an information for requesting an information on a fee charged for received multicast data, to the routing device by using a network layer protocol, and means for recognizing an accounting information from a returned multicast control packet by using the network layer protocol, where the returned multicast control packet is added with an accounting information by an accounting processing to be carried out when the multicast data to be delivered is an accounting target, by using the network layer protocol, in response to the multicast control packet for requesting a fee information from a client host.

9. A routing device in a multicast communication system having a routing device connected to a network and one or more client hosts connected to the network through this routing device, and in which means for receiving a multicast control packet for requesting joining or leaving a multicast group, which is transmitted by each one of the one or more client hosts, delivery means for receiving multicast data to which a specific address is assigned for each multicast group, and delivering it to client hosts participating in that multicast group, means for receiving a multicast control packet that is transmitted by each one of the one or more client hosts by adding an information for requesting an information on a fee charged for received multicast data, by using a network layer protocol, means for returning a multicast control packet to which an accounting information by an accounting processing to be carried out when multicast data to be delivered is an accounting target is added, by using the network layer protocol, in response to the multicast control packet for requesting a fee information from a client host.

* * * * *